United States Patent
Fukashiro

(10) Patent No.: US 8,693,869 B2
(45) Date of Patent: Apr. 8, 2014

(54) OPTICAL TRANSPORT APPARATUS AND OPTICAL TRANSPORT SYSTEM

(75) Inventor: Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 13/315,001

(22) Filed: Dec. 8, 2011

(65) Prior Publication Data

US 2012/0155871 A1  Jun. 21, 2012

(30) Foreign Application Priority Data

Dec. 9, 2010  (JP) ................................. 2010-274835

(51) Int. Cl.
   *H04B 10/00* (2013.01)

(52) U.S. Cl.
   USPC ............................................. 398/50; 398/83

(58) Field of Classification Search
   USPC ............................................. 398/45–57, 83
   See application file for complete search history.

(56) References Cited

U.S. PATENT DOCUMENTS

| | | | | |
|---|---|---|---|---|
| 8,131,151 B2 * | 3/2012 | Palacharla | ....................... | 398/83 |
| 8,155,521 B2 * | 4/2012 | Chung et al. | ................... | 398/50 |
| 8,320,759 B2 * | 11/2012 | Boduch | ......................... | 398/48 |
| 8,406,624 B2 * | 3/2013 | Kimura et al. | ................. | 398/49 |
| 2006/0098981 A1 | 5/2006 | Miura et al. | | |
| 2008/0056715 A1 | 3/2008 | Akiyama et al. | | |
| 2009/0136233 A1 | 5/2009 | Fukashiro | | |
| 2009/0226168 A1 | 9/2009 | Boduch | | |
| 2009/0232497 A1 | 9/2009 | Archambault et al. | | |
| 2012/0155871 A1 * | 6/2012 | Fukashiro | ....................... | 398/50 |

FOREIGN PATENT DOCUMENTS

| | | |
|---|---|---|
| JP | 2006-140598 | 6/2006 |
| JP | 2008-060773 | 3/2008 |
| JP | 2009-130618 A | 6/2009 |
| JP | 2010-098547 A | 4/2010 |

* cited by examiner

*Primary Examiner* — Agustin Bello
(74) *Attorney, Agent, or Firm* — Foley & Lardner LLP

(57) ABSTRACT

In an embodiment of the invention, an optical transport apparatus comprises first wavelength-division-multiplex optical signal processing units each corresponding to each of transmission lines, an interface unit connected to a client apparatus and converting a client signal to and from a signal to be wavelength-division multiplexed, and a second wavelength-division-multiplex optical signal processing unit connected to the interface unit and receiving the signal to be wavelength-division multiplexed from the interface unit. Each of the first wavelength-division-multiplex optical signal processing units includes a wavelength selective switch including inputs, multiplexing signals selected from optical input signals received from the inputs and outputting the multiplex signal to a corresponding transmission line. The second wavelength-division-multiplex optical signal processing unit includes an optical splitter splitting an optical signal including the signal to be wavelength-division multiplexed and outputting the split signals to the wavelength selective switches in the first wavelength-division-multiplex optical signal processing units.

12 Claims, 12 Drawing Sheets

OPTICAL TRANSPORT APPARATUS AND OPTICAL TRANSPORT SYSTEM

CLAIM OF PRIORITY

The present application claims priority from Japanese patent application JP 2010-274835 filed on Dec. 9, 2010, the content of which is hereby incorporated by reference into this application.

BACKGROUND OF THE INVENTION

This invention relates to an optical transport apparatus and an optical transport system and, in particular, relates to an optical transport apparatus and an optical transport system having wavelength division multiplexing and optical add-drop capabilities.

Recent drastic increase in data traffic represented by the Internet is propelling expansion of transport capacity in a communication network. Such expansion of transport capacity is achieved by time division multiplexing technology and optical wavelength division multiplexing technology. Currently, point-to-point wavelength division multiplexing systems are in practical use, achieving long distance transport over several-hundred kilometers with transmitters at 10 Gbit/s for a channel, several to dozens of channels of wavelengths multiplexed on a single optical fiber, and optical amplifiers or regenerators.

In order to meet increasing demand for larger transport capacity, further cost effectiveness, and more diverse services in the future, optical ring networks are being studied that annularly connect communication nodes. In addition, for more flexible route selection, optical mesh networks are being studied that connect communication nodes like meshes.

Optical transport apparatuses used in the optical ring networks are called optical add-drop multiplexers (OADMs). Optical transport apparatuses used in the optical mesh networks are called optical cross-connects (OXCs).

These optical transport apparatuses can pass optical signals through the nodes without converting the optical signals into electric signals; consequently, an overall network can be attained inexpensively. In addition, simpler operation can be achieved by a network management system that remotely and unitarily manages the nodes. Furthermore, easier management and speedier establishment of an end-to-end path from a starting point to a terminal point of a line can be expected through cooperation of supervisory controllers in individual nodes.

The OADMs and OXCs use optical switches to select either add-drop or letting through of optical signals and to select routes. Currently, some technologies are known to provide such optical switches, for example, semiconductor switches and $LiNO_3$ switches utilizing changes in refractive index caused by application of electric field to the material, and planar lightwave circuit (PLC) switches utilizing changes in refractive index caused by application of heat to the material.

In addition to these switches, also known are optical switches with moving parts that move optical fibers or lenses with electric magnets, micro-electro-mechanical system (MEMS) switches that control micro mirrors, which are produced by a semiconductor technology, by statistic electricity, and liquid crystal optical switches that select transmission or reflection of optical signals by changing voltage to apply to the liquid crystal.

As an applied technology of the MEMS or the liquid crystal technologies, wavelength selective switches (WSSs) which have wavelength division multiplexing functionality in addition to selecting functionality are known. For example, JP 2006-140598A discloses an optical transmission apparatus including WSSs.

JP 2006-140598A discloses that an optical route switching means selects signal light of one or more wavelengths from wavelength division multiplexing (WDM) light received from any one of the input ports to output it from any of the output ports. According to JP 2006-140598A, this configuration achieves a change of route from a route for signal light of intended wavelengths included in WDM light to different routes without demultiplexing the WDM light by individual wavelengths like a conventional technique; consequently, considerable number of ports required for the optical route switching means can be reduced.

JP 2008-60773A discloses an optical transmission apparatus in which the output direction of an added optical signal is not fixed to allow discretional selection of the output direction. According to JP 2008-60773A, the optical transmission apparatus has optical add-drop functionality to add/drop an optical signal of any wavelength to an intended direction to/from any add-drop unit; consequently, the apparatus can easily cope with increase or decrease in the number of directions and the number of wavelengths while achieving simpler and more compact apparatus structure.

SUMMARY OF THE INVENTION

For more flexible routing and more diverse services, demanded is addition of directions to an existing network to change network topology. A typical example of the change of network topology is a change from an optical ring network into an optical mesh network.

This change of the network topology requires an optical transport apparatus that can cope with the reconfiguration from a ring into a mesh. The optical transport apparatus (OADM) used in an optical ring network is adapted to a ring configuration with two fiber transmission lines connected. Accordingly, the optical transport apparatus is required to cope with the extension to increase the number of connected transmission lines with migration of the network topology. It is crucial that an optical transport apparatus in a mesh optical network has high flexibility in selecting a route.

Moreover, as indicated in JP 2008-60773A, in a traditional OADM used in a ring network, the transmission line to output an added optical signal is fixed; operations and maintenance of the OADM are performed under such conditions. Accordingly, it is demanded for the optical transport apparatus to cope with increase in the transmission lines and the flexibility in route selection while keeping the operability and serviceability in the traditional configuration.

In the meanwhile, to improve the operability of the network, it is also demanded for the optical transport apparatus to support point-to-multipoint communication in which the receivers of a plurality of nodes receive optical signals outputted from the transmitter of a single node, as well as point-to-point communication in which the receiver of a single node receives an optical signal outputted from the transmitter of a single node.

Thus, an aspect of this invention is an optical transport apparatus connected to a plurality of transmission lines which includes a plurality of first wavelength-division-multiplex optical signal processing units each corresponding to each of the plurality of transmission lines, an interface unit which is connected to a client apparatus and converts a client signal to and from a signal to be wavelength-division multiplexed, and a second wavelength-division-multiplex optical signal processing unit which is connected to the interface unit and receives the signal to be wavelength-division multiplexed from the interface unit. Each of the plurality of first wavelength-division-multiplex optical signal processing units includes a wavelength selective switch including a plurality of inputs, multiplexing signals selected from optical input signals received from the plurality of inputs and outputting the multiplex signal to a corresponding transmission line. The second wavelength-division-multiplex optical signal processing unit includes an optical splitter for splitting an optical signal including the signal to be wavelength-division multiplexed and outputting the split signals to the wavelength selective switches in the plurality of first wavelength-division-multiplex optical signal processing units An aspect of this invention enables an optical transport apparatus in which a transmission line to output an added optical signal is fixed, like an optical transport apparatus adapted to a ring configuration, to cope with increase in transmission lines while keeping the operability and serviceability.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE EMBODIMENTS

Hereinafter, preferred embodiments of this invention will be described with reference to the accompanying drawings. For clarity of explanation, the following descriptions and the accompanying drawings contain omissions and simplifications as appropriate. Throughout the drawings, the like components are denoted by like reference signs and their repetitive explanation is omitted for clarity of explanation, if not necessary.

First Embodiment

Figure 1A:
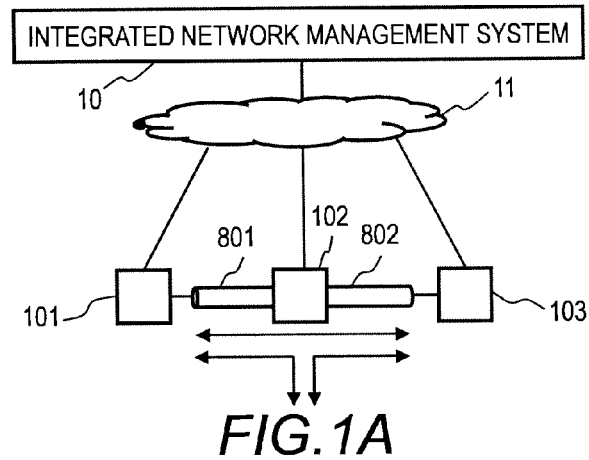
FIG. 1A is a drawing schematically illustrating an exemplary network topology to which an optical transport apparatus of this invention is applicable.

With reference to FIGS. 1A to 8, a first embodiment of this invention will be explained. This embodiment has a feature in an optical transport apparatus in an optical network system. The optical transport apparatus in this embodiment can work in various network topologies. FIGS. 1A to 1C schematically illustrate typical optical network systems to which the optical transport apparatus in this embodiment is applicable.

FIG. 1A schematically illustrates a linear network. The network of FIG. 1A includes three optical transport apparatuses (nodes) 101 to 103, where the two optical transport apparatuses 101 and 103 are the end nodes. Between the optical transport apparatuses 101 and 103, the optical transport apparatus 102 is provided; the optical transport apparatuses 101 and 102 are connected with a fiber transmission line 801 and the optical transport apparatuses 102 and 103 are connected with a fiber transmission line 802. The fiber transmission lines 801 and 802 transmit main optical signals in two ways. The same applies to the other fiber transmission lines in the following explanation.

The optical transport apparatus 102 can drop at least a part of signals added by the optical transport apparatus 101 or 103. The optical transport apparatus 102 can also add different signals. The solid lines with arrows in FIG. 1A indicate paths established between the optical transport apparatuses 101 and 102, between the optical transport apparatuses 102 and 103, and between the optical transport apparatuses 103 and 101. These paths are merely examples.

Figure 1B:
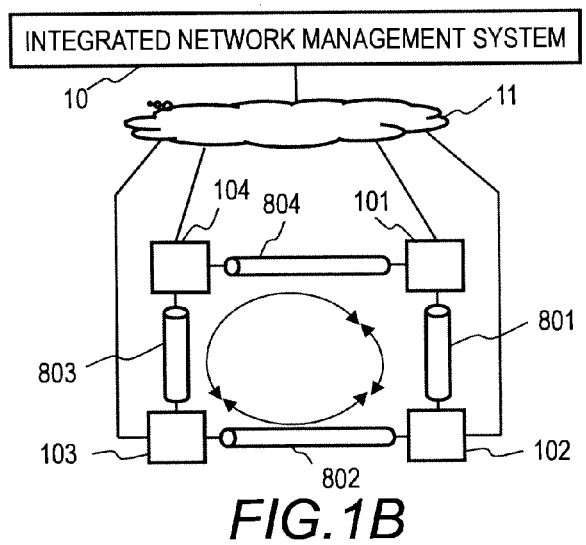
FIG. 1B is a drawing schematically illustrating another exemplary network topology to which an optical transport apparatus of this invention is applicable.

FIG. 1B schematically illustrates a ring network. This example includes four optical transport apparatuses (nodes) 101 to 104 and adjacent optical transport apparatuses are connected with fiber transmission lines. Specifically, a fiber transmission line 801 connects the optical transport apparatuses 101 and 102; a fiber transmission line 802 connects the optical transport apparatuses 102 and 103; a fiber transmission line 803 connects the optical transport apparatuses 103 and 104; and a fiber transmission line 804 connects the optical transport apparatuses 104 and 101.

Since the network forms a ring, if some failure occurs to any one point of the fiber transmission lines, signal transmission in the reversed direction can protect a signal against the failure. Another advantage of the ring network is relatively easy operation. In FIG. 1B, the solid lines with arrows indicate paths established between the optical transport apparatuses 101 and 102, between the optical transport apparatuses 102 and 103, and between the optical transport apparatuses 101 and 103 via 104. These paths are merely examples.

Figure 1C:
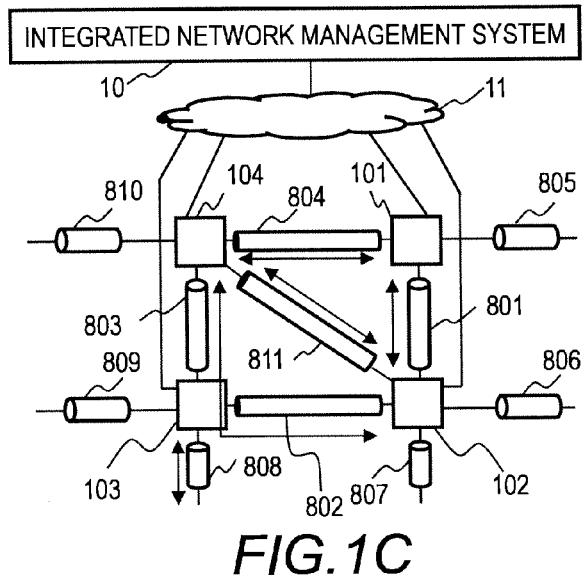
FIG. 1C is a drawing schematically illustrating yet another exemplary network topology to which an optical transport apparatus of this invention is applicable.

FIG. 1C illustrates a mesh network. In this example, optical transport apparatuses (nodes) 101 to 104 and not-shown other optical transport apparatuses are connected with mesh-like fiber transmission lines. FIG. 1C shows fiber transmission lines 801 to 811. The solid lines with arrows indicate paths established between nodes. These paths are merely examples. The mesh network is more difficult in operation management than the ring network, but is highly flexible in changing the route of the paths depending on conditions.

In any of the systems shown in FIGS. 1A to 1C, the optical transport apparatuses 101 to 104 perform communications through a network management system (network management server) 10 and a data communication network 11. The network management system 10 manages the resources of the network as well as the configurations, operations, performance, and alarms of the optical transport apparatuses 101 to 104. The optical transport apparatuses 101 to 104 transport optical signals in accordance with instructions (control) of the network management system 10.

As described above, the optical transport apparatus in this embodiment can be applied to one or more optical nodes in any of the network topologies shown in FIGS. 1A to 1C. An advantage of the optical transport apparatus in this embodiment is high adaptability to extension from a ring configuration into a mesh configuration with the serviceability and operability in the existing configuration of the optical transport apparatus. Hereinafter, extension of the optical transport apparatus in this embodiment from a ring configuration to a mesh configuration will be described.

Figure 2:
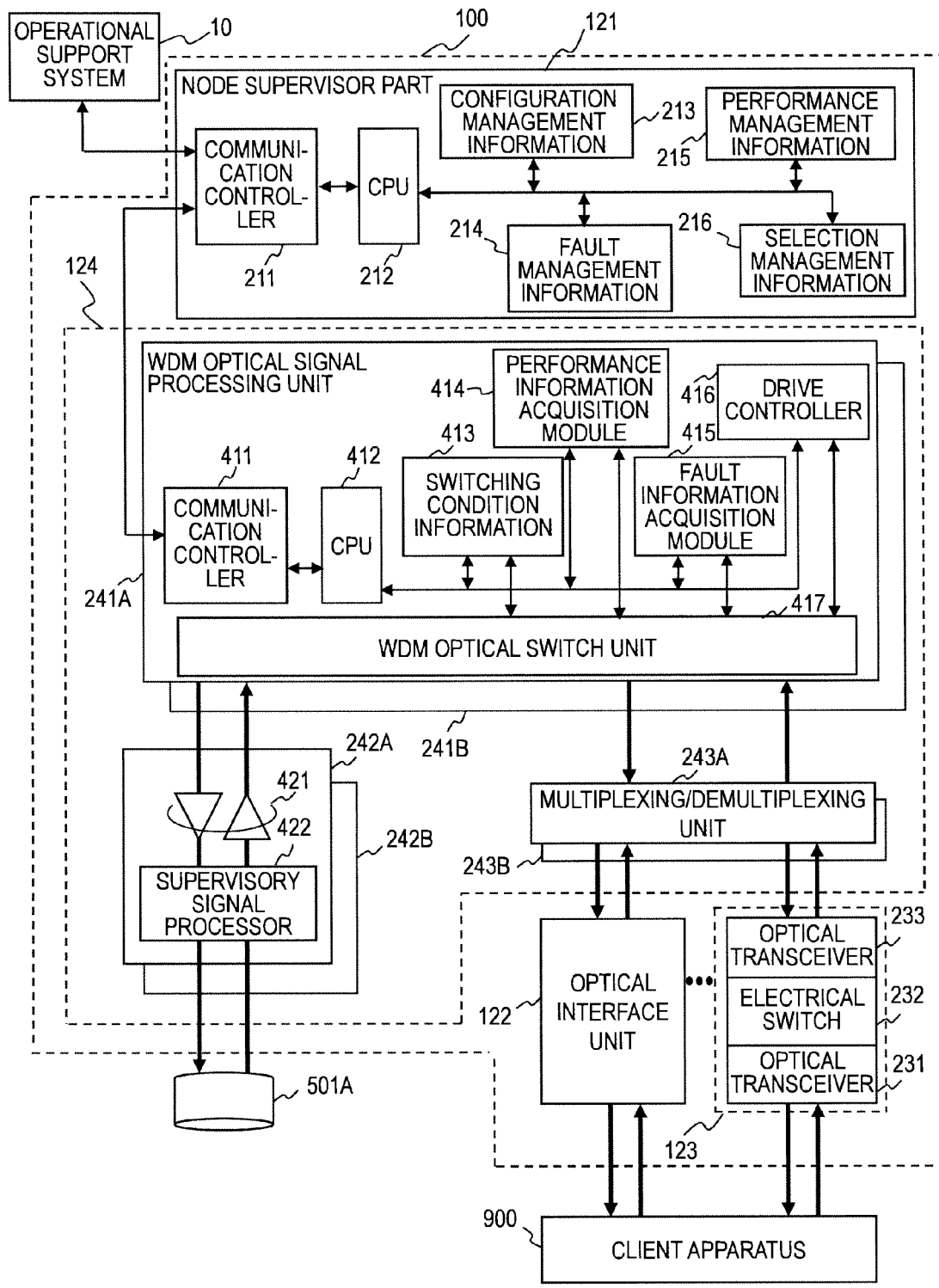
FIG. 2 is a drawing schematically illustrating an exemplary configuration of an optical transport apparatus in the first embodiment.

First, with reference to FIG. 2, an overall configuration of an optical transport apparatus 100 in a ring configuration will be explained. For example, the optical transport apparatus 100 is used as the optical transport apparatus 102 in FIG. 1B. The configuration shown in FIG. 2 is merely an example and the optical transport apparatus 100 may have a different configuration. The optical transport apparatus 100 includes a node supervisor part 121 and an optical add-drop part 124. The optical add-drop part 124 adds a wavelength-division multiplex signal to a transmission line or drops a signal of an intended wavelength from a wavelength-division multiplex signal received from the transmission line to send the signal to an interface unit. It should be noted that the interface unit is nominal designation to express an optical interface unit 122 and a photo-electric interface unit 123 (optical transceivers 231 and 233) without discrimination.

The optical add-drop part 124 includes a wavelength division multiplexing (WDM) optical signal processing units 241A, 241B, optical amplifier units 242A, 242B, and optical multiplexing/demultiplexing units 243A, 243B.

The WDM optical signal processing units 241A, 241B are connected to the optical amplifier units 242A, 242B, respectively. The WDM optical signal processing units 241A, 241B are also connected to the optical multiplexing/demultiplexing units 243A, 243B, respectively. The WDM optical signal processing units 241A, 241B have the same structure. Hereinbelow, explanations will be provided about the configuration and the operations of the WDM optical signal processing unit 241A and other configurations relating thereto; explanations about the WDM optical signal processing unit 241B will be omitted.

The optical transport apparatus 100 includes a plurality of interface units connected to the optical multiplexing/demultiplexing unit 243A. Of the plurality of interface units, FIG. 2 shows an optical interface unit 122 and a photoelectric interface unit 123 by way of example. The optical transport apparatus 100 may include only one kind of interface units. The interface units are connected to the ports of a client apparatus 900.

The optical transport apparatus 100 is connected to two transmission lines and FIG. 2 shows one of them, the transmission line 501A connected to the optical amplifier unit 242A, by way of example. The transmission line 501A supports bi-directional signal transmission. The optical transport apparatus 100 applies wavelength-division-multiplexing to signals from the plurality of interface units and the other transmission line and outputs the multiplexed signal to the transmission line 501A. Otherwise, the optical transport apparatus 100 drops a signal of a desired wavelength from a wavelength-division multiplex signal received from the transmission line 501A and sends the dropped signal to the client apparatus 900.

The optical interface unit 122 processes overheads, monitors the quality of main signal using bit interleaved parities (BIPs), and converts the wavelength of a client signal received from the client apparatus 900 into a wavelength to be outputted to the transmission line. In the example of FIG. 2, the client apparatus 900 has a plurality of ports and one interface unit corresponds to client signals from one of the ports. A different client apparatus may be connected to a different interface unit.

The optical interface unit 122 may also perform error corrections specified by ITU-T recommendation G.709, for example, in order to compensate for variation in loss, which could be caused by elongated transmission distance, seasonal variations of the fiber, or physical external force to the fiber, or deterioration by other causes such as aging of components.

For example, the optical interface unit 122 receives signals for interfaces of STM-16 (2.5 Gbit/s), STM-64 (10 Gbit/s), and STM-256 (40 Gbit/s) from the client apparatus, converts them into signals at the line rates of OTU1 (2.7 Gbit/s), OTU2 (10.7 Gbit/s), and OTU3 (42.80 bit/s), respectively, specified by the ITU-T G.709 OTN and the wavelengths specified by the ITU-T, and outputs the converted signals to the WDM optical signal processing unit 241A via the multiplexing/demultiplexing unit 243A. Furthermore, it has a function to convert signals from the WDM optical signal processing unit 241A reversely to the above-described conversion.

The optical interface unit 122 may have a function to regenerate a signal of OTUn (n=1, 2, 3) from a signal to be switched from one transmission line to another at some optical node. The optical interface unit 122 may also support client signals at GbE (1 Gbit/s) defined by IEEE 802.3z or 10 GbE (10.3 Gbit/s) defined by IEEE 802.3ae. The interface data rate with the WDM optical signal processing unit 241A can be obtained by adding the rate of error correction codes, for example, approximately 7% to 25%, to these values.

The optical transport apparatus 100 may include a photoelectric interface unit 123 instead of or in addition to the optical interface unit 122. For example, the photoelectric interface unit 123 includes an optical transceiver 231 that receives an optical signal from the client apparatus 900 and converts it into an electric signal, an electrical switch 232 for switching the electric signal from the optical transceiver 231 at a desired unit, and an optical transceiver 233 that receives the electric signal from the electrical switch 232 and converts it to an optical signal appropriate for a signal to be wavelength-division multiplexed.

In the optical add-drop part 124, the optical multiplexing/demultiplexing unit 243A multiplexes signals to be wavelength-division multiplexed received from a plurality of interface units or demultiplexes a signal received from a transmission line into a plurality of signals to be wavelength-division multiplexed. The combination of the WDM optical signal processing unit 241A and the optical amplifier unit 242A receives and transmits optical signals for the transmission line 501A.

The WDM optical signal processing unit 241A includes a communication controller 411, a processor (CPU) 412, switching condition information 413, performance information acquisition module 414, fault information acquisition module 415, a drive controller 416, and a WDM optical switch unit 417. The information is held in a memory. The WDM optical switch unit 417 performs wavelength multiplexing/demultiplexing and selection of the wavelengths of an optical signal. Details on the WDM optical switch unit 417 will be described later.

The drive controller 416 applies a voltage to the WDM optical switch unit 417 to drive it, under the control of the CPU 412. The CPU 412 stores control information in the switching condition information 413 and the drive controller 416 drives the WDM optical switch unit 417 in accordance with the switching condition information 413. The CPU 412 may directly control the drive controller 416 and store the information of the result of control in the switching condition information 413.

The performance information acquisition module 414 monitors and stores the wavelength and the optical power of received signals and the optical power of outputted signals. The CPU 412 can calculate optical power loss from the performance information. The CPU 412 can detect an abnormal input or output operation with reference to the optical power loss.

The fault information acquisition module 415 detects a failure in the WDM optical switch unit 417 and stores information on it. The CPU 412 periodically acquires information from the fault information acquisition module 415 and, when it acquires information indicating a failure, it notifies the node supervisor part 121 of the failure via the communication controller 411. It should be noted that the CPU 412 may take a part of the management operations performed by other electric circuits or other electric circuits may take a part of the operations of the CPU 412.

The node supervisor part 121 monitors and controls the overall optical transport apparatus 100 including the plurality of WDM optical signal processing units. The node supervisor part 121 includes a communication controller 211, a processor (CPU) 212, configuration management information 213, error management information 214, performance management information 215, and selection management information 216. The CPU 212 collects the information and stores it in a memory. Other electric circuits may perform this operation.

The configuration management information 213 includes configuration information on the optical transport apparatus 100, such as the number of WDM optical signal processing units and the number of connected transmission lines. The error management information 214 includes fault information of the optical transport apparatus 100 and the performance management information 215 includes performance information of the optical transport apparatus 100. The selection management information 216 includes information on selection of the WDM optical signal processing units 241A, 241B.

The CPU 212 acquires information to transfer signals (signals on the transmission lines and signals from a connected client) through the communication controller 211, creates information to instruct the WDM optical signal processing unit 241A on selection from the acquired information, and stores it in the selection management information 216. The WDM optical signal processing unit 241A receives the information held in the selection management information 216 from the node supervisor part 121 and operates the WDM optical switch unit 417 through the drive controller 416 in accordance with the information.

The optical amplifier unit 242A amplifies an optical wavelength-division multiplex signal as it is an optical signal and outputs it to the fiber transmission line 501A. The optical amplifier unit 242A amplifies a signal from the WDM optical signal processing unit 241A at an optical amplifier 421 and outputs it to the fiber transmission line. It also amplifies a wavelength-division multiplex signal received from the fiber transmission line and forwards it to the WDM optical signal processing unit 241A. Moreover, the optical amplifier unit 242A includes a supervisory signal processor 422. The supervisory signal processor 422 superimposes a supervisory signal onto the wavelength-division multiplex signal to be transmitted through the transmission line and exchanges the supervisory signals between nodes.

The optical power in outputting a signal to the fiber transmission line is determined in consideration of the number of wavelengths, transmission line loss between optical nodes, a noise figure in the optical amplifier, an optical signal-to-noise ratio (OSNR), and waveform distortion and increase in noise caused by non-linear effect, chromatic dispersion and polarization mode dispersion in the fiber.

As the nonlinear effect, self phase modulation (SPM), cross phase modulation (XPM), and four-wave-mixing (FWM) are known. The amount of waveform distortion depends on the number of wavelengths, the fiber dispersion, the nonlinear coefficient, the input power to the fiber, the optical fiber loss, etc.

The output power of the optical amplifier 421 before being outputted to the optical interface unit 122 is determined in consideration of the loss at the WDM optical signal processing unit 241A, the OSNR at the end of the path, the dynamic range and the receiver sensitivity of the receiver, and the like. Dispersion compensation functionality to compensate for the waveform distortion caused by chromatic dispersion in the fiber may be incorporated into the optical amplifier unit or the interface unit.

To achieve the dispersion compensation functionality, dispersion compensation fibers differing from the fiber transmission lines in coding, and means utilizing fiber diffraction grating, an optical lens, a resonator, or electric signal processing are known. The wavelengths of the optical signals outputted from the optical interface unit 122 are the wavelengths on the wavelength grids defined by the ITU-T recommendations G694.1 and G694.2 and the number of wavelengths may be selected from various choices, for example, 8, 16, 20, 40, 64, 80, 128, or 160, by devising transmission conditions.

Figure 3:
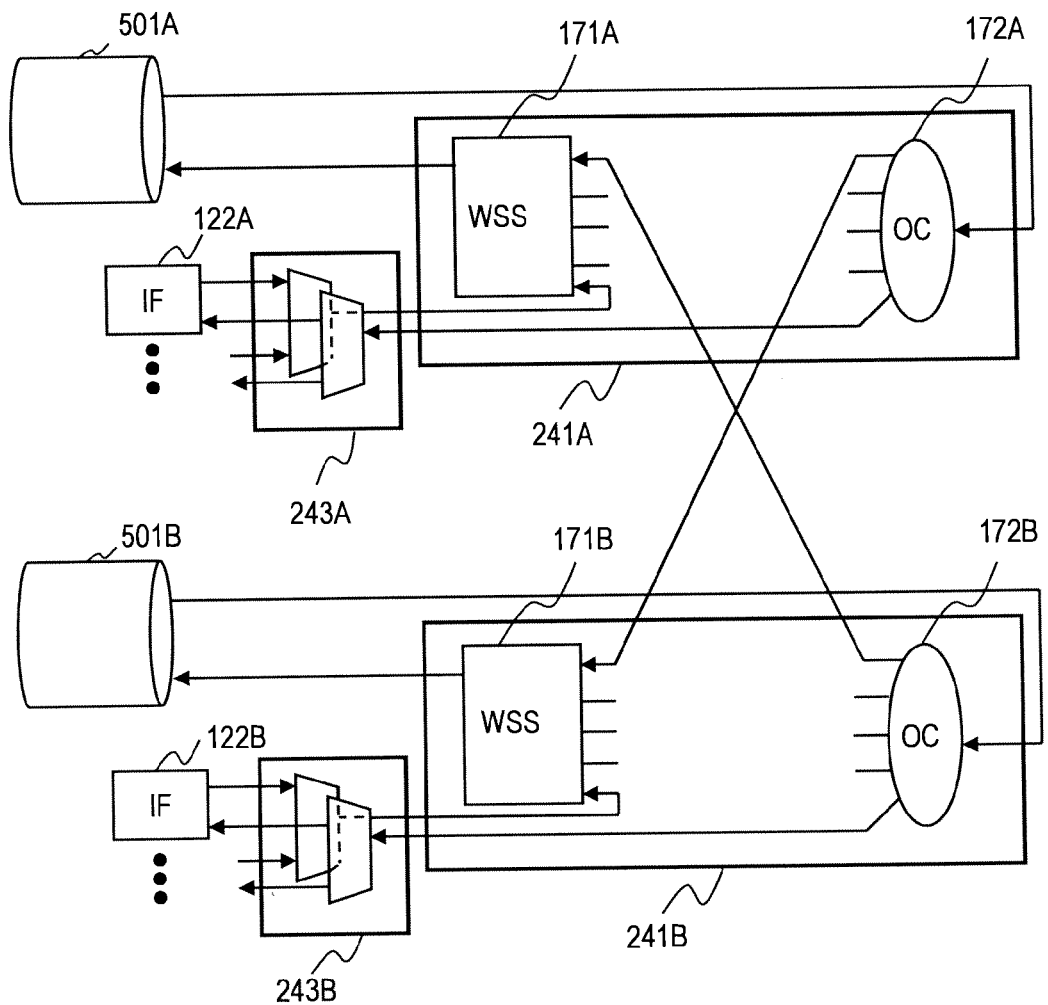
FIG. 3 is a drawing schematically illustrating an exemplary configuration of an optical transport apparatus adapted to a ring configuration with two fiber transmission lines connected in the first embodiment.

FIG. 3 schematically illustrates connections of optical signals in the optical transport apparatus 100 adapted to a ring configuration with two transmission lines connected. FIG. 3 schematically illustrates part of the configuration of the WDM optical signal processing units 241A, 241B while including omissions of most of the components in the WDM optical signal processing units 241A, 241B for clarity of explanation. In the following explanation on the connections of optical signals, the number of ports in optical couplers (optical splitters) and wavelength selective switches are merely examples and the effect of this embodiment is not limited to a specific number of ports.

The WDM optical signal processing unit 241A is connected to the transmission line 501A and the optical multiplexing/demultiplexing unit 243A. The WDM optical signal processing unit 241B is connected to the transmission line 501B and the optical multiplexing/demultiplexing unit 243B. To the optical multiplexing/demultiplexing units 243A, 243B, the optical interface units 122A, 122B, respectively, are connected. To each of the optical multiplexing/demultiplexing units 243A, 243B, a plurality of interface units are connected; the optical interface units 122A, 122B are part of them.

The WDM optical signal processing unit 241A includes a wavelength selective switch (WSS) 171A and an optical coupler (OC) 172A. The WDM optical signal processing unit 241B includes a wavelength selective switch (WSS) 171B and an optical coupler (OC) 172B. Since the optical couplers 172A, 172B serve as optical splitters, they are referred to as optical splitters 172A, 172B in the following description.

In the example of FIG. 3, the wavelength selective switches 171A, 171B are 1×5 wavelength selective switches with five inputs and one output. The optical splitters 172A, 172B are 1×5 optical splitters with five outputs and one input. The wavelength selective switches 171A, 171B and the optical splitters 172A, 172B are components of the WDM optical switch unit 417.

One output of the WDM optical signal processing unit 241A is connected to the transmission line 501A and another output is connected to the optical interface 122A via the optical multiplexing/demultiplexing unit 243A. One input of the WDM optical signal processing unit 241A is connected from the transmission line 501A and another input is connected from the optical interface 122A via the optical multiplexing/demultiplexing unit 243A, and yet another input is connected from the WDM optical signal processing unit 241B.

Specifically, the output of the wavelength selective switch 171A is connected to the transmission line 501A and one of the outputs of the optical splitter 172A is connected to one of the inputs of the wavelength selective switch 171B in the other WDM optical signal processing unit 241B. The transmission line 501A is connected to the input of the optical splitter 172A; the optical interface 122A is connected to one of the inputs of the wavelength selective switch 171A; and one of the outputs of the optical splitter 172B in the WDM optical signal processing unit 241B is connected to one of the inputs of the wavelength optical selection switch 171A.

The same applies the optical signal line connection in the WDM optical signal processing unit 241B. The output of the wavelength selective switch 171B is connected to the transmission line 501B and one of the outputs of the optical splitter 172B is connected to one of the inputs of the wavelength selective switch 171A in the other WDM optical signal processing unit 241A. The transmission line 501B is connected to the input of the optical splitter 172B; the optical interface 122B is connected to one of the inputs of the wavelength selective switch 171B; and one of the outputs of the optical splitter 172A in the WDM optical signal processing unit 241A is connected to one of the inputs of the wavelength optical selective switch 171B.

The remaining inputs of the wavelength selective switches 171A, 171B and the remaining outputs of the optical splitters 172A, 172B are for extension; they are not connected to any component in this configuration.

Next, the flow of an optical signal in this configuration will be explained. An optical signal received from the optical interface 122A is multiplexed with optical signals from other interface units by the optical multiplexing/demultiplexing unit 243A and enters the wavelength selective switch 171A (signal add). The wavelength selective switch 171A selects necessary signal wavelengths from the optical signals received from the optical multiplexing/demultiplexing unit 243A and the transmission line 501B and multiplexes the selected signals. The wavelength-division multiplex signal from the wavelength selective switch 171A is outputted to the optical transmission line 501A.

The optical signal received from the transmission line 501A is split by the optical splitter 172A; one signal enters the optical multiplexing/demultiplexing unit 243A and the other enters the wavelength selective switch 171B in the WDM optical signal processing unit 241B. The optical multiplexing/demultiplexing unit 243A demultiplexes the optical signal received from the optical splitter 172A. The optical interface 122A receives a signal of the wavelength the optical interface 122A supports and forwards it to the client apparatus (signal drop).

The operations in the WDM optical signal processing unit 241B are the same as those in the WDM optical signal processing unit 241A. An optical signal received from the optical interface 122B is multiplexed with optical signals from the other interface units by the optical multiplexing/demultiplexing unit 243B and enters the wavelength selective switch 171B (signal add). The wavelength selective switch 171B selects necessary signal wavelengths from the optical signals received from the optical multiplexing/demultiplexing unit 243B and the transmission line 501A and multiplexes the selected signals. The wavelength-division multiplex signal from the wavelength selective switch 171B is outputted to the optical transmission line 501B.

The optical signal received from the transmission line 501B is split by the optical splitter 172B; one signal enters the optical multiplexing/demultiplexing unit 243B and the other enters the wavelength selective switch 171A. The optical multiplexing/demultiplexing unit 243B demultiplexes the optical signal received from the optical transmission line 501B. The optical interface 122B receives a signal of the wavelength the optical interface 122B supports and forwards it to the client apparatus (signal drop).

As understood from the foregoing explanation, in this configuration, the transmission line to output the added signal is fixed. That is to say, the client signal added at the WDM optical signal processing unit 241A is outputted to the transmission line 501A. The client signal added at the WDM optical signal processing unit 241B is outputted to the transmission line 501B.

For this reason, optical multiplexing/demultiplexing units and interface units for individual transmission lines are required. It is advantageous that this configuration can be attained if WDM optical signal processing units in the same number of transmission lines can be provided. The optical multiplexing/demultiplexing unit can employ a PLC element called arrayed waveguide grating (AWG). Since the AWG is configured to have output ports corresponding to wavelengths, the input and output ports of an interface unit are connected to those of an optical multiplexing/demultiplexing unit in accordance with the input and output wavelengths of the interface unit.

Figure 4A:
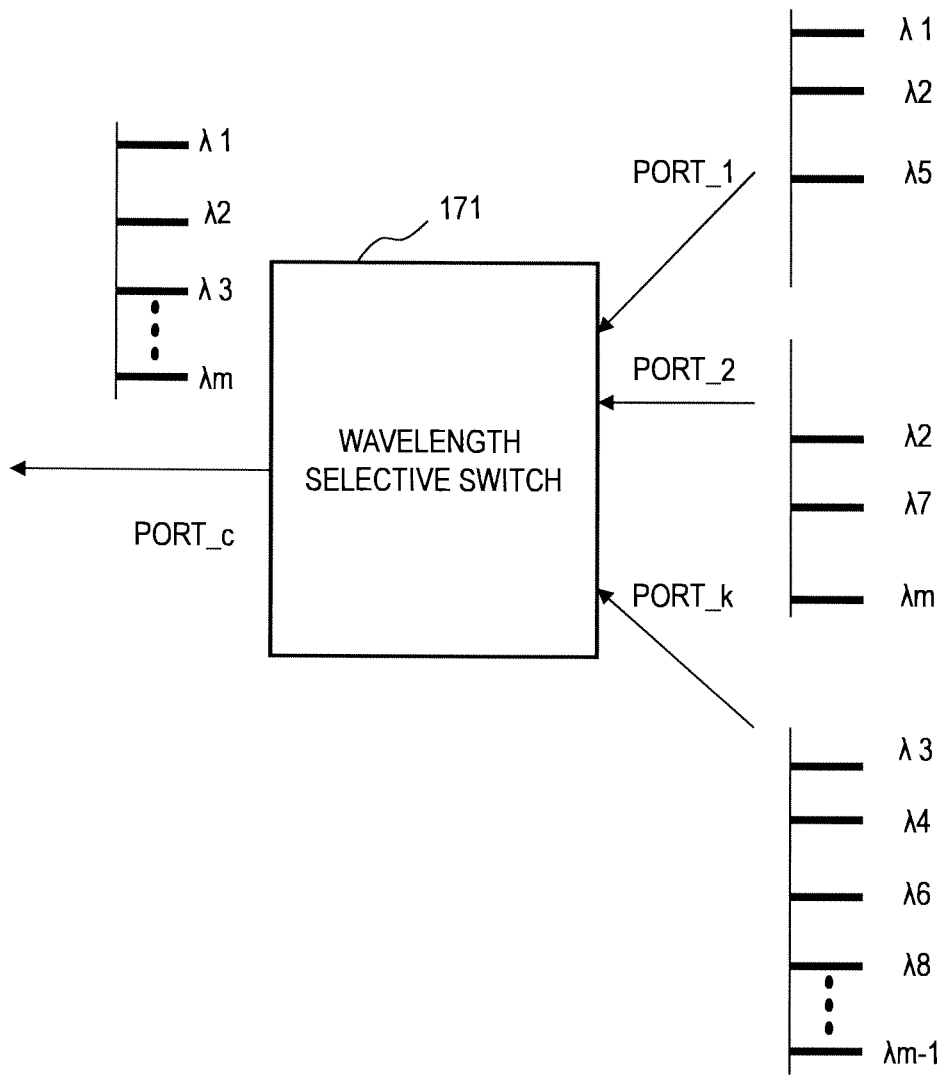
FIG. 4A is a drawing schematically illustrating the function of a wavelength selective switch in the optical transport apparatus in the first embodiment.
Figure 4B:
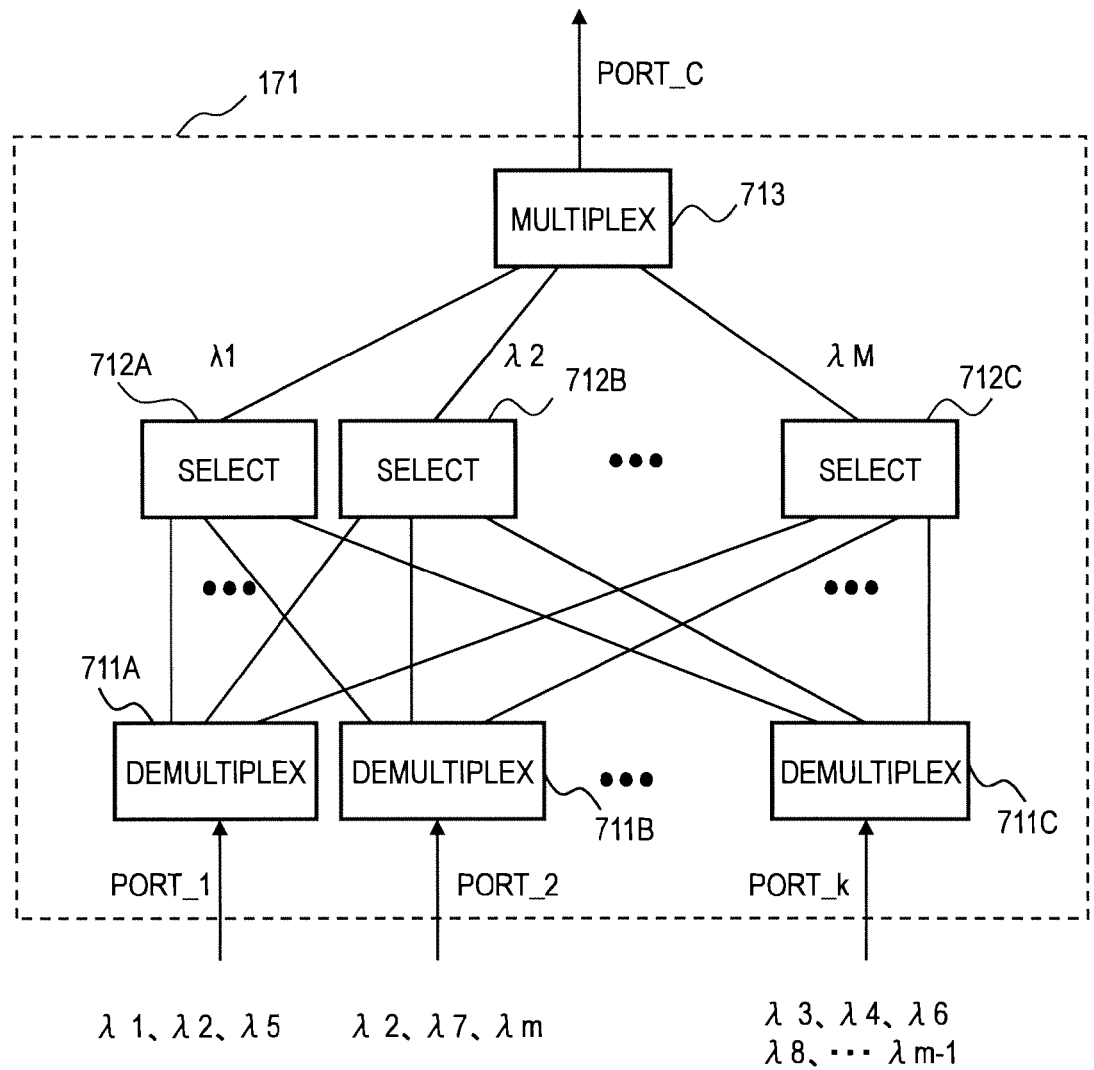
FIG. 4B is a drawing schematically illustrating an exemplary configuration of the function blocks of a wavelength selective switch in the first embodiment.

FIGS. 4A and 4B illustrate a configuration example 171 applicable to the wavelength selective switches 171A, 171B in this embodiment. The wavelength selective switch 171 receives wavelength-division multiplex signals from a plurality of input ports and imposes predetermined control on them to output a signal at one or more intended wavelengths from output ports.

In FIG. 4A, the wavelength selective switch 171 receives an optical signal at the wavelengths of $\lambda 1$, $\lambda 2$, and $\lambda 5$ from PORT_1, an optical signal at the wavelengths of $\lambda 2$, $\lambda 7$, and $\lambda m$ from PORT_2, and an optical signal at other wavelengths of λ3, λ4, λ6, λ8, . . . and λm−1 from PORT_k. An output PORT_c outputs a wavelength-division multiplex signal.

In the example of FIG. 4A, signals having the wavelength λ2 are inputted from both of the PORT_1 and PORT_2. The wavelength selective switch 171 selects a signal of the wavelength λ2 from either one of the input ports. This operation eliminates optical signals of the same wavelength from being duplicated in the signal outputted from the output port PORT_c. It should be noted that λ2 is merely an example and the wavelength selective switch 171 has the same selection functions for one or more wavelengths other than λ2.

FIG. 4B shows exemplary function blocks of the wavelength selective switch 171. The wavelength selective switch 171 includes a plurality of demultiplexers each corresponding to a port. It further includes a plurality of selective switches each corresponding to a wavelength of input signals. FIG. 4B shows demultiplexers 711A, 711B, 711C corresponding to PORT_1, PORT_2, PORT_k, respectively. In addition, it shows selective switches 712A, 712B, 712C corresponding to wavelengths λ1, λ2, λm, respectively.

When the wavelength selective switch 171 receives wavelength-division multiplex signals from the PORT_1, PORT_2, and PORT_k, the demultiplexers 711A, 711B, 711C demultiplex the respective wavelength-division multiplex signals into signals having different wavelengths. The selective switches 712A, 712B, 712C receive signals having the wavelengths of wavelengths λ1, λ2, λm, respectively, and select optical signals (ports) to be outputted to a multiplexer 713.

Through this operation, the wavelength selective switch 171 can output a wavelength-division multiplex signal from the multiplexer 713 without duplication even if the PORT_1 to PORT_k receive the same wavelength signals. In this example, signals at λ2 are inputted to the PORT_1 and the PORT_2, but the selective switch 712B for λ2 selects a signal at the wavelength λ2 from either one of the ports to output it to the multiplexer 713.

Figure 5:
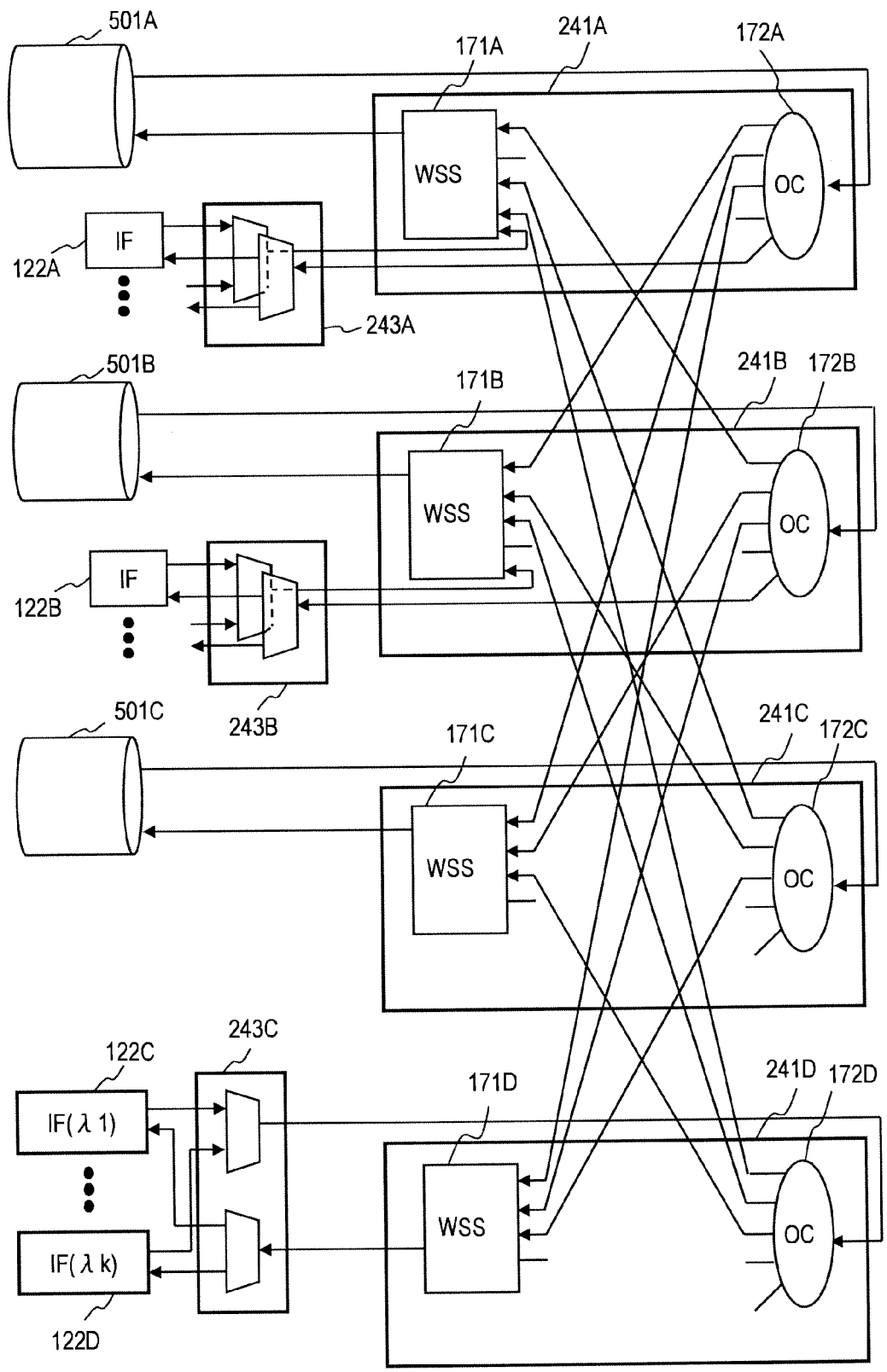
FIG. 5 is a drawing schematically illustrating an exemplary configuration of the optical transport apparatus extended from a ring configuration to a mesh configuration in the first embodiment.

FIG. 5 schematically illustrates the configuration of the optical transport apparatus 100 extended from the ring configuration shown in FIG. 3 into a mesh configuration. In the optical transport apparatus 100 in FIG. 5, a fiber transmission line 501C is newly connected and, consequently, three transmission lines are connected to the optical transport apparatus. Together with the addition of the transmission line 501C, a WDM optical signal processing unit 241C is also added. Moreover, a WDM optical signal processing unit 241D, and an optical multiplexing/demultiplexing unit 243C and a plurality of interface units for the WDM optical signal processing unit 241D are added. The optical interface units 122C, 122D are shown in the drawing with reference signs, exemplifying the interface units.

A feature of this configuration is that the WDM optical signal processing unit 241D can output signals which received from the interface units to be wavelength-division multiplexed to any of the transmission lines. This configuration achieves high flexibility in route selection in a mesh network. Moreover, extension of the functionality of the optical transport apparatus 100 does not require any change in the existing apparatus structure. The optical transport apparatus 100 can be extended to have a mesh configuration, while keeping the operability and serviceability in the ring configuration.

Hereinafter, the configuration and signal transport of the optical transport apparatus 100 adapted to a mesh configuration will be explained. Explanation on the configuration which has already been provided is omitted if not necessary. The WDM optical signal processing units 241C, 241D have the same device structure (hardware structure) as the other WDM optical signal processing units 241A, 241B.

The WDM optical signal processing unit 241C includes a wavelength selective switch 171C and an optical splitter 172C and the WDM optical signal processing unit 241D includes a wavelength selective switch 171D and an optical splitter 172D. The optical transport apparatus 100 includes other configuration in the node supervisor part and the optical add-drop part, but explanation thereof is omitted.

The WDM optical signal processing unit 241D differs from the other WDM optical signal processing units 241A to 241C in the connection of optical signal lines to the other components. Specifically, in the WDM optical signal processing unit 241D, the input of the optical splitter 172D is connected from the output of the optical multiplexing/demultiplexing unit 243C. Three outputs of the optical splitter 172D are connected to the inputs of the wavelength selective switches 171A to 171C in the other WDM optical signal processing units 241A to 241C. Accordingly, an optical signal from the optical multiplexing/demultiplexing unit 243C is input signals for all of the wavelength selective switches 171A to 171C.

In the WDM optical signal processing unit 241D, the output of the wavelength selective switch 171D is connected to the input of the optical multiplexing/demultiplexing unit 243C. The three inputs of the wavelength selective switch 171D are connected from the optical splitters 172A to 172C in the other WDM optical signal processing units 241A to 241C. The wavelength selective switch 171D selects wavelengths from the signals received from the transmission lines 501A to 501C (the optical splitters 172A to 172C) in accordance with the setting and outputs a wavelength-division multiplex signal at the selected wavelengths to the optical multiplexing/demultiplexing unit 243C.

As described above, in the WDM optical signal processing unit 241D, a signal from the interface unit enters the optical splitter 172D and the optical splitter 172D splits the optical signal to output the split signals to the transmission lines 501A to 501C (the wavelength selective switches 171A to 171C). This configuration allows the optical transport apparatus 100 to output an optical signal to an intended transmission line in the transmission lines 501A to 501C.

The wavelength selective switch 171D which receives optical signals from the transmission lines 501A to 501C outputs optical signals to the optical multiplexing/demultiplexing unit 243C. This configuration allows the optical transport apparatus 100 to receive an optical signal from any of the transmission lines 501A to 501C.

Figure 6:
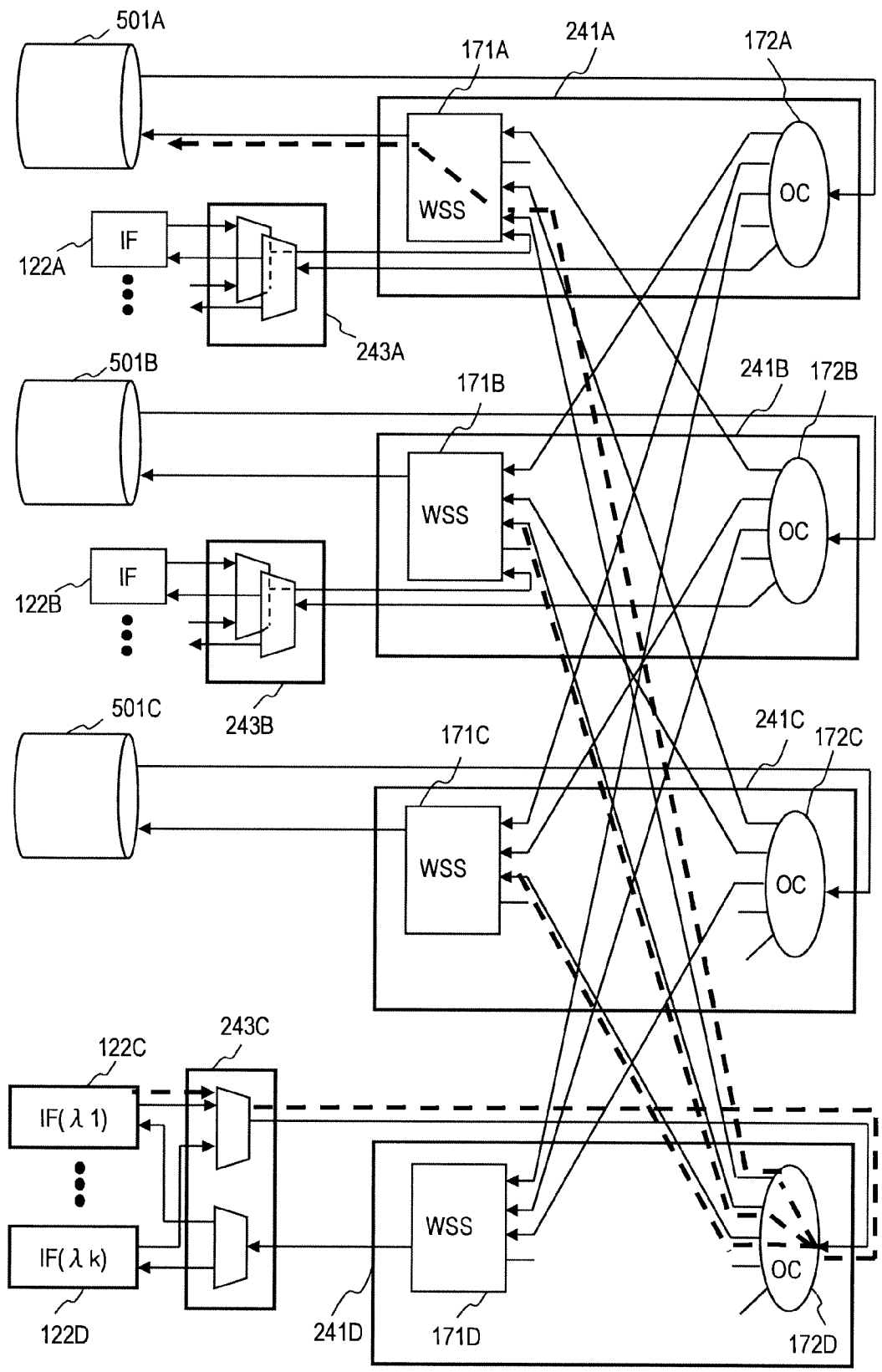
FIG. 6 illustrates exemplary flow of optical signals in optical transport with the optical transport apparatus adapted to a mesh configuration in the first embodiment.

With reference to FIG. 6, an example will be explained in which the optical transport apparatus 100 outputs an optical signal of a wavelength λ1 received at the added optical interface unit 122C to the transmission line 501A. The signal λ1 to be wavelength-division multiplexed from the interface unit 122C enters the optical multiplexing/demultiplexing unit 243C together with signals to be wavelength-division multiplexed sent from the other interface units. The optical multiplexing/demultiplexing unit 243C multiplexes the signals to be wavelength-division multiplexed received from the interface units and sends the wavelength-division multiplex signal to the optical splitter 172D.

The optical splitter 172D splits an inputted optical signal into a plurality of signals having approximately equal optical powers. The split signals each include all input wavelengths and enter the wavelength selective switches 171A to 171C in the WDM optical signal processing units 241A to 241C.

The wavelength selective switch 171A passes the optical signal λ1 in the input signal received from the WDM optical signal processing unit 241D. At this time, it may pass an optical signal received from a different WDM optical signal processing unit and having a different wavelength simultaneously. The same applies the following examples. The wavelength-division multiplex signal including the optical signal λ1 is transmitted through the transmission line 501A. The other wavelength selective switches 171B, 171C block optical signals λ1 from the WDM optical signal processing unit 241D. The optical signals λ1 are not outputted to either the transmission lines 501B or 501C.

Figure 7:
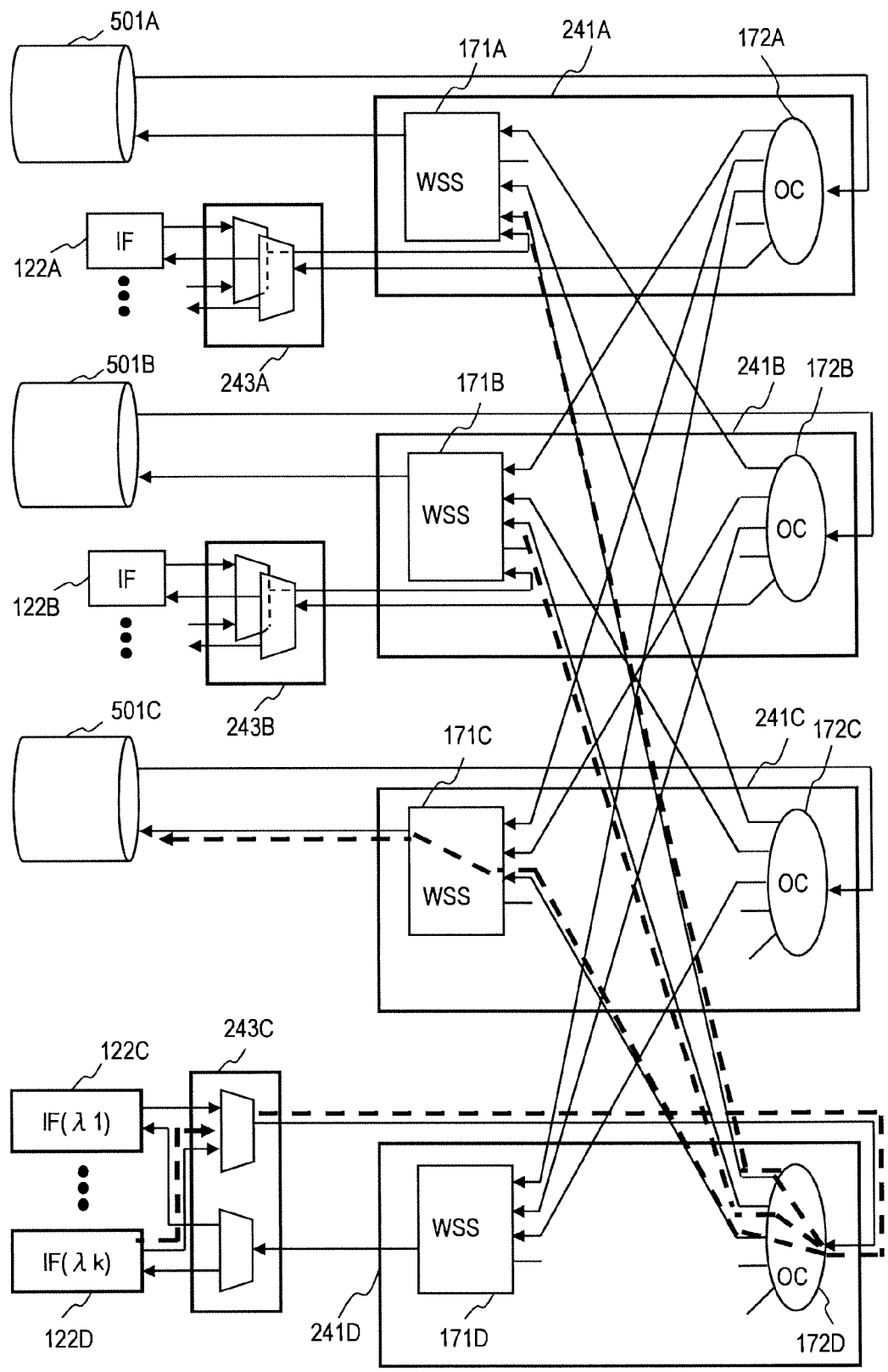
FIG. 7 illustrates other exemplary flow of optical signals in optical transport with the optical transport apparatus adapted to a mesh configuration in the first embodiment.

Next, with reference to FIG. 7, an example will be explained in which the optical transport apparatus 100 outputs an optical signal λk received at the added interface unit 122D to the transmission line 501C. The signal λk to be wavelength-division multiplexed received at the interface unit 122D is multiplexed by the optical multiplexing/demultiplexing unit 243C together with signals to be wavelength-division multiplexed received at the other interface units and enters the optical splitter 172D.

The optical splitter 172D splits the inputted optical signal into a plurality of signals having approximately equal optical powers. The split signals enter the wavelength selective switches 171A to 171C in the WDM optical signal processing units 241A to 241C.

The wavelength selective switch 171C passes the optical signal λk, which is an input signal from the WDM optical signal processing unit 241D. The wavelength-division multiplex signal including the optical signal λk is transmitted through the transmission line 501C. The other wavelength selective switches 171A, 171B block the optical signals λk. The optical signals λk are not outputted to either the transmission lines 501A or 501C.

To output a signal λ1 to be wavelength-division multiplexed in the interface unit 122 to the transmission line 501B, the wavelength selective switch 171B passes the optical signal λ1 received from the optical splitter 172D in the WDM optical signal processing unit 241D and the other wavelength selective switches 171A, 171C block the optical signals λ1.

Figure 8:
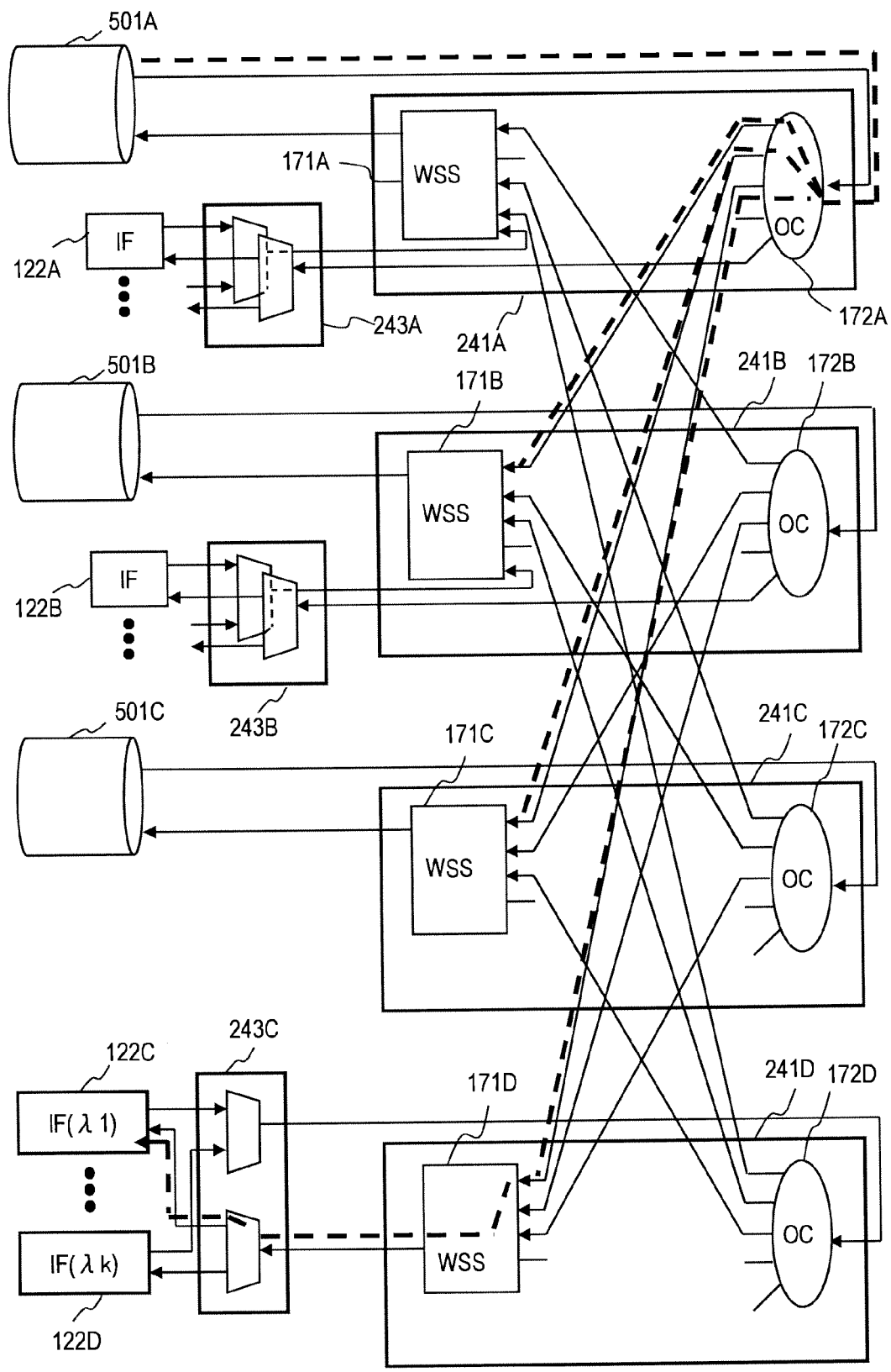
FIG. 8 illustrates yet other exemplary flow of optical signals in optical transport with the optical transport apparatus adapted to a mesh configuration in the first embodiment.

Next, with reference to FIG. 8, an example will be explained in which the optical transport apparatus 100 forwards an optical signal λ1 included in an input signal received from the transmission line 501A to the added interface unit 122C. The optical splitter 172A in the WDM optical signal processing unit 241A splits the optical signal received from the transmission line 501A into a plurality of signals having approximately equal optical powers. The plurality of split optical signals enter the wavelength selective switches 171B to 171D in the other WDM optical signal processing unit 241B to 241D.

The wavelength selective switch 171D passes the optical signal λ1 in the signal received from the WDM optical signal processing unit 241A. The other wavelength selective switches 171B, 171C block the optical signals λ1. The signal outputted from the wavelength selective switch 171D includes the optical signal λ1. The optical multiplexing/demultiplexing unit 243C demultiplexes the input signal and outputs the optical signal λ1 to the interface unit 122C.

As described above, in this embodiment, the optical transport apparatus 100 can cope with addition of a transmission line while keeping the serviceability and operability in the existing ring configuration. In particular, as long as the wavelengths for the added interface are selected not to duplicate with those for the existing interfaces, the existing interfaces will never be affected by the addition.

Moreover, the optical transport apparatus 100 can select any transmission line to output an added signal (client signal) from the added interface by splitting the added signal with an optical splitter and supplying the wavelength selective switches for the individual transmission lines with the split signals. The optical transport apparatus 100 can also receive an optical signal from any transmission line by receiving signals from the optical splitters for the individual transmission lines at the wavelength selective switches and selectively passing signals of one or more wavelengths.

In the foregoing configuration, the four WDM optical signal processing units 241A to 241D have the same circuit construction. Since modules having the same hardware structure can be used, the optical transport system (optical transport apparatuses) can be constructed efficiently. It is preferable that the WDM optical signal processing units have the same structure, but they may have different structures.

For example, the WDM optical signal processing units 241A to 241D may have wavelength selective switches instead of the optical splitters 172A to 172D. Since an optical splitter has a simpler structure than a wavelength selective switch, it is preferable to use optical splitters. Moreover, to be adapted to support point-to-multipoint communications, which will be explained later in the third embodiment, it is preferable that the WDM optical signal processing units 241A to 241D include optical splitters 172A to 172D instead of wavelength selective switches.

If the WDM optical signal processing units 241A to 241C include wavelength selective switches to receive signals from the transmission lines, the WDM optical signal processing unit 241D may include an optical splitter instead of the wavelength selective switch 171D, depending on the design. The wavelength selective switches in the WDM optical signal processing units 241A to 241C select an optical signal to be outputted to the interface unit for the WDM optical signal processing unit 241D.

Although omitted in the explanation on FIGS. 5 to 8, an optical multiplexing/demultiplexing unit and an interface unit may be connected to the WDM optical signal processing unit 241C. Depending on the design, the wavelength selective switches 171A to 171D may be connected to the outputs of only part of the optical splitters in the other WDM optical signal processing units.

The optical transport apparatus in this embodiment is particularly suitable to an optical transport apparatus connected to three or more transmission lines, but an optical transport apparatus with two transmission lines connected may include the WDM optical signal processing unit 241D. The optical transport apparatus can output an added signal received by the WDM optical signal processing unit 241D from the interface unit to an intended one of the two transmission lines. It can also split an optical signal received from any transmission line to transfer it to a client apparatus connected to an interface unit.

The foregoing optical transport apparatus 100 includes one WDM optical signal processing unit 241D for selecting an intended transmission line, but the optical transport apparatus 100 may include a plurality of WDM optical signal processing units for selecting an intended transmission line.

Second Embodiment

Hereinafter, with reference to FIG. 9, a second embodiment will be explained. This embodiment explains an exemplary optical transport apparatus that can cope with addition of a transmission line while keeping the serviceability and operability in the existing ring configuration and further allows discretionary selection of a connection between an interface unit and an optical multiplexing/demultiplexing unit as well as a transmission line to output an added signal.

In the first embodiment, the wavelength at the output port to the interface unit for the optical multiplexing/demultiplexing unit 243C is fixed. The optical transport apparatus 100 in this embodiment allows selection of wavelength of an optical signal at the output port of the optical multiplexing/demultiplexing unit. The interface unit can connect to the port of any optical multiplexing/demultiplexing unit regardless of the wavelength in transmission and receiving.

Figure 9:
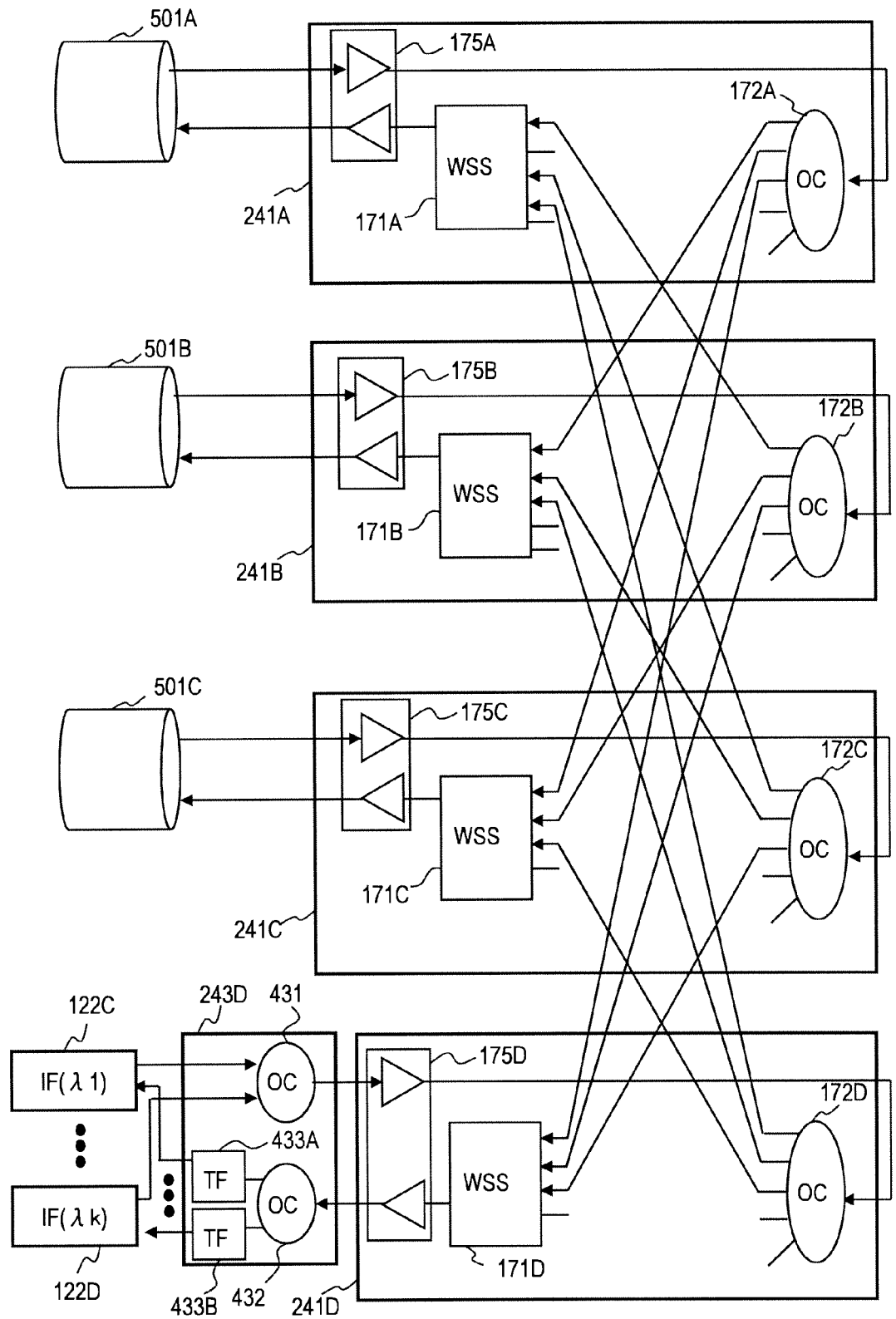
FIG. 9 is a drawing schematically illustrating an exemplary configuration of an optical transport apparatus in the second embodiment.

FIG. 9 is a block diagram illustrating an exemplary optical transport apparatus 100 in this embodiment. As to the optical transport apparatus 100 in FIG. 9, explanation on the same part as the one in the configuration illustrated in FIG. 3 or FIG. 5 will be omitted as it has already been explained. In the configuration shown in FIG. 9, the optical multiplexing/demultiplexing unit 243D includes an optical coupler 431 with k inputs and one output, an optical coupler 432 with one input and k outputs, and a plurality of wavelength-tunable filters. Of the wavelength-tunable filters, two wavelength-tunable filters are denoted by reference signs 433A, 433B. In this description, the optical coupler 432 with one input and k outputs is referred to as optical splitter to indicate its function.

To the input ports of the optical coupler 431, outputs of a plurality of interface units are connected. The optical coupler 431 couples signals from the interface units together to send them to the optical splitter 172D. To the output ports of the optical splitter 432, inputs of the interface units are connected. To connect to the interface units, the number of input ports of the optical coupler 431 and the number of output ports of the optical splitter 432 are the same. The number of ports may be the same as the number of maximum wavelengths to be multiplexed in each transmission line or less than that.

To each output port of the optical splitter 432, a wavelength-tunable filter is mounted. The wavelength-tunable filter selectively outputs an optical signal at a set wavelength. The node supervisor part 121 sets a transmit wavelength to the wavelength-tunable filter in accordance with an instruction from the operation support system 10. The wavelength-tunable filter passes optical signals at the set wavelength and blocks signals at the wavelengths outside the set range. In this way, the wavelength-tunable filter selects and outputs the wavelengths to be received by the corresponding interface unit.

In the configuration of FIG. 9, the wavelength-tunable filter 433A selects a wavelength for the output port connected to the optical interface unit 122C. Specifically, the wavelength-tunable filter 433A passes only an optical signal of the wavelength λ1. The wavelength-tunable filter 433B selects a wavelength for the output port connected to the optical interface unit 122D. Specifically, the wavelength-tunable filter 433B passes only an optical signal of the wavelength λk.

In this configuration, an interface unit can connect to any input port of the optical multiplexing/demultiplexing unit 243D regardless of the wavelength of the optical signal. Since the wavelength to be received by the interface unit can be selected by properly setting the wavelength to be passed to the wavelength-tunable filter, the interface unit can be connected to any output port of the optical multiplexing/demultiplexing unit 243D regardless of the wavelength of the optical signal inputted to the interface unit.

Preferably, wavelength-tunable filters should be mounted on all of the output ports of the optical multiplexing/demultiplexing unit 243D. Depending on the design, wavelength-tunable filters may be mounted on only part of the output ports of the optical multiplexing/demultiplexing unit 243D and fixed filters may be mounted on the remaining output ports. Otherwise, wavelength-tunable filters may be mounted on the interface units.

As illustrated in FIG. 9, in a preferred configuration, the WDM optical signal processing units 241A to 241D include optical amplifier units 175A to 175D on the output sides of the wavelength selective switches 171A to 171D and on the input sides of the optical splitters 172A to 172D. The optical amplifier units 175A to 175C amplify the power of optical signals received from and transmitted to the transmission lines 501A to 501C to values appropriate to be processed in the n subsequent to the WDM optical signal processing units 241A to 241C and satisfying the quality for signal transport. The optical amplifier unit 175D amplifies the power of optical signals received from and transmitted to the multiplexing/demultiplexing unit 243D to a value appropriate to be processed in the hardware subsequent to the WDM optical signal processing unit 241D and satisfying the signal quality.

As described above, the optical amplifier units 175A to 175C enable the WDM optical signal processing units to output optical signals at powers appropriate for the transmission lines and the interface units. Also, they can make the power of the optical signals received from the transmission lines and the interface units at values appropriate for the WDM optical signal processing units. The optical transport apparatus 100 may include only either the optical amplifiers for the transmission lines or the optical amplifiers for the interface units. The WDM optical signal processing units 241A to 241C may include optical amplifiers for the interface units.

Third Embodiment

Figure 10:
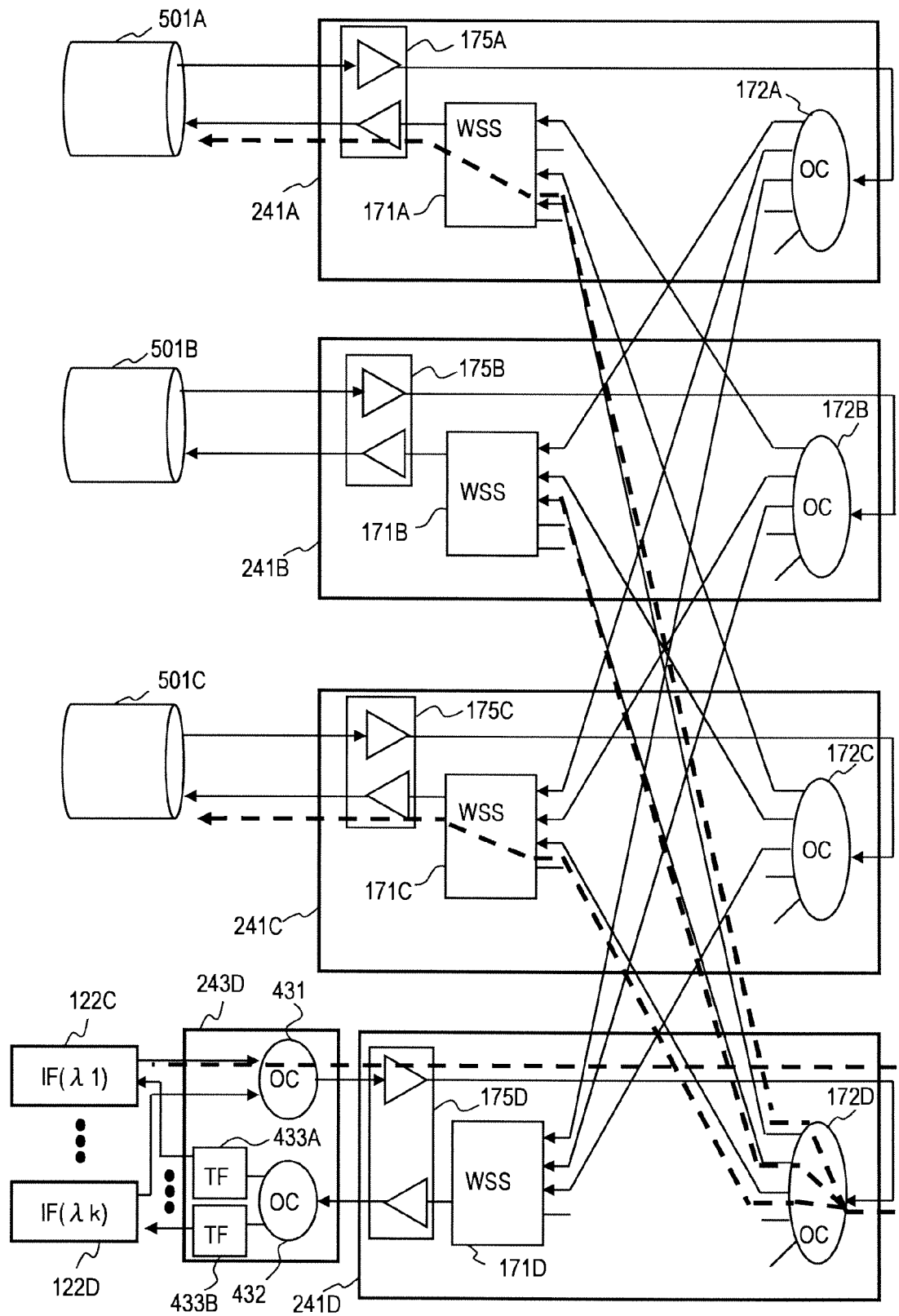
FIG. 10 illustrates exemplary flow of optical signals in point-to-multipoint communication by the optical transport apparatus in the third embodiment.
Figure 11:
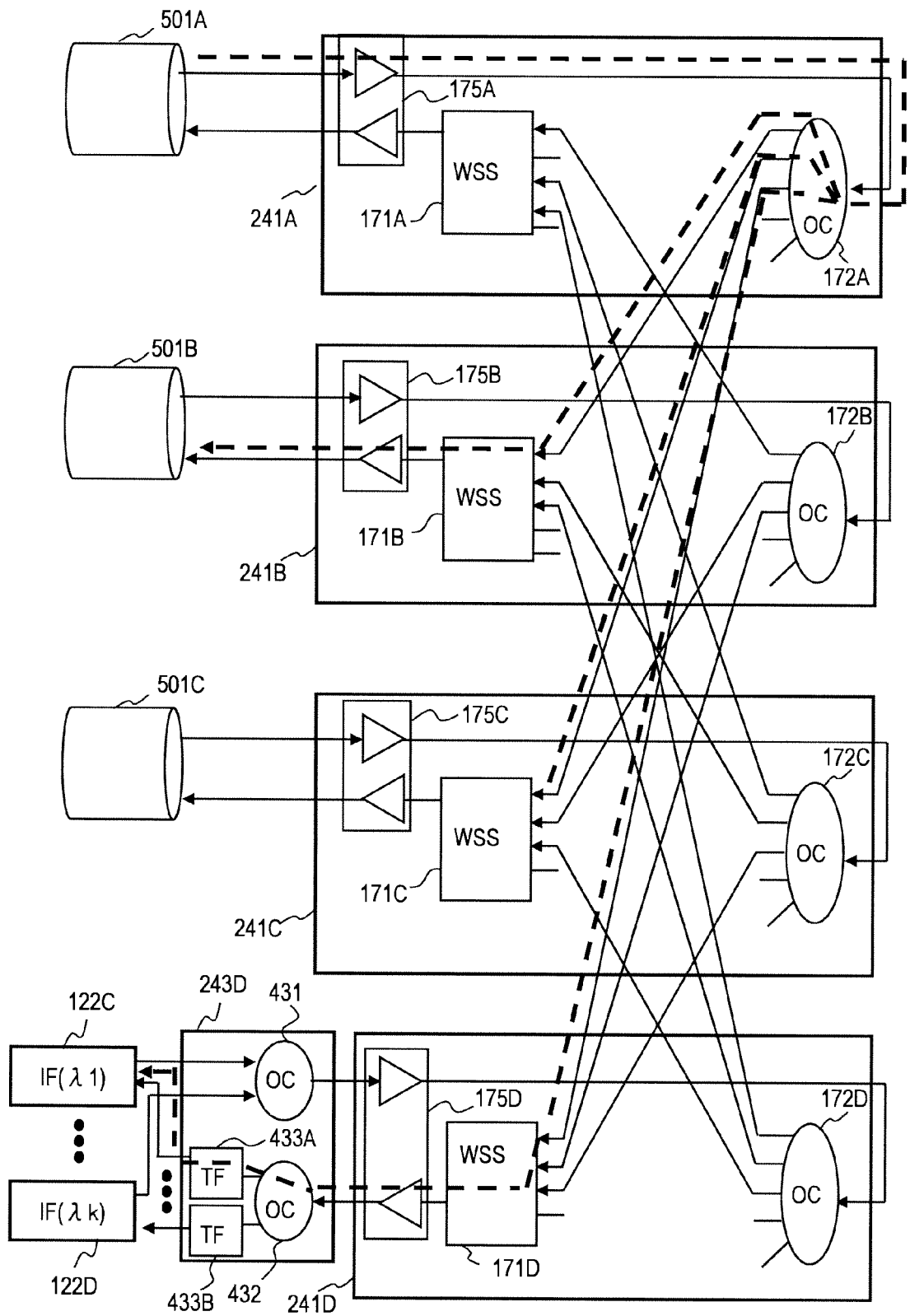
FIG. 11 illustrates other exemplary flow of optical signals in point-to-multipoint communication by the optical transport apparatus in the third embodiment.

Hereinafter, with reference to FIGS. 10 and 11, a third embodiment will be explained. In this embodiment, explanation on the configuration that has already been explained in the first or the second embodiment will be omitted. The optical transport apparatus 100 explained in the first and the second embodiment has a configuration that can support point-to-multipoint communication. This embodiment explains point-to-multipoint communication with the optical transport apparatus 100. To use a specific signal in the point-to-multipoint communication, the optical transport apparatus 100 multicasts the optical signal.

The optical transport apparatus 100 can transfer an optical signal added from a WDM optical signal processing unit 241D for selection of transmission line to a plurality of transmission lines simultaneously. A plurality of wavelength selective switches of the wavelength selective switches 171A to 171C for outputting signals to transmission lines 501A to 501C select the added signal to output it to the transmission lines.

It also transfers an optical signal in any one of the transmission lines to any other intended transmission line as well as the client apparatus connected to the WDM optical signal processing unit 241D. The wavelength selective switch 171D in the WDM optical signal processing unit 241D and the wavelength selective switches for the any other transmission lines select the same optical signal.

First, an example in which an added signal to the WDM optical signal processing unit 241D is outputted to a plurality of transmission lines will be explained with reference to FIG. 10. This example outputs an added signal λ1 from the optical interface unit 122C to two transmission lines 501A and 501C.

The signal λ1 to be wavelength-division multiplexed in the optical interface 122C enters the optical coupler 431 in the optical multiplexing/demultiplexing unit 243D together with optical signals from the other interface units. The optical coupler 431 couples the signals from the plurality of interface units together and sends the wavelength-division multiplex signal to the optical splitter 172D.

The optical splitter 172D splits the inputted optical signal to a plurality of signals having approximately equal optical powers. The split signals each include all the input wavelengths and enter the wavelength selective switches 171A to 171C in the WDM optical signal processing unit 241A to 241C.

The wavelength selective switch 171A, 171C pass optical signals λ1 in their respective input signals received from the WDM optical signal processing unit 241D. The wavelength-division multiplex signals including the optical signals λ1 are amplified by the optical amplifiers 175A, 175C and outputted to the transmission lines 501A, 501C. The wavelength selective switch 171B blocks the optical signal λ1 received from the WDM optical signal processing unit 241D. The optical signal λ1 is not outputted to the transmission line 501B.

Next, with reference to FIG. 11, an example of transferring an optical signal λ1 in a wavelength-division multiplex signal received from the transmission line 501A to the optical interface unit 122C and the transmission line 501B will be explained. The optical splitter 172A in the WDM optical signal processing unit 241A splits a wavelength-division multiplex signal received from the transmission line 501A via the optical amplifier 175A into a plurality of signals having approximately equal optical powers. The plurality of split optical signals individually enter the wavelength selective switches 171B to 171D in the other WDM optical signal processing unit 241B to 241D.

The wavelength selective switch 171B passes an optical signal λ1 in the signal received from the WDM optical signal processing unit 241A. The wavelength-division multiplex signal outputted from the wavelength selective switch 171B includes the optical signal λ1; it is amplified by the optical amplifier 175B and outputted to the transmission line 501B. The wavelength selective switch 171C blocks the optical signal λ1 in the signal received from the WDM optical signal processing unit 241A.

The wavelength selective switch 171D passes the optical signal λ1 in the signal received from the WDM optical signal processing unit 241A. The signal outputted from the wavelength selective switch 171D includes the optical signal λ1. The signal outputted from the wavelength selective switch 171D enters the optical multiplexing/demultiplexing unit 243D via the optical amplifier 175D. The optical splitter 432 splits the input signal and the wavelength-tunable filter 433A passes the optical signal λ1. The interface unit 122C receives the optical signal λ1 from the wavelength-tunable filter 433A.

As described above, an optical splitter splits a wavelength-division multiplex signal and a plurality of wavelength selective switches that receive the split wavelength-division multiplex signals pass optical signals at a desired wavelength in the wavelength-division multiplex signals to achieve the point-to-multipoint communication. Although the above-described optical transport apparatus has a configuration explained in the second embodiment, the configuration explained in the first embodiment allows the point-to-multipoint communication in the same manner.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transport apparatus connected to a plurality of transmission lines, the optical transport apparatus comprising:
a plurality of first wavelength-division-multiplex optical signal processing units which correspond to, on a one-to-one basis, different transmission lines of the plurality of transmission lines, and configured to communicate optical signals with the corresponding transmission lines, respectively;
a plurality of first interface units which correspond to, on a one-to-one basis, different first wavelength-division-multiplex optical signal processing units of the plurality of first wavelength-division-multiplex optical signal processing units and configured to communicate optical signals with the corresponding first wavelength-division-multiplex optical signal processing units, respectively, and each of which is connected to at least one first client apparatus and configured to convert a client signal to and from a signal to be wavelength-division multiplexed;
a second interface unit which is connected to at least one client apparatus different from client apparatuses connected to the plurality of first interface units and configured to convert client signals to and from signals to be wavelength-division multiplexed; and
a second wavelength-division-multiplex optical signal processing unit which is capable of being added to and removed from the optical transport apparatus and configured to communicate the signals to be wavelength-division multiplexed with the second interface unit,
wherein each of the plurality of first wavelength-division-multiplex optical signal processing units includes:
a first wavelength selective switch including a plurality of inputs, configured to multiplex signals selected from optical input signals received from the plurality of inputs and output the multiplex signal to the corresponding transmission line; and
a first optical splitter configured to receive an optical signal from the corresponding transmission line and output split optical signals to the first interface unit corresponding to the first wavelength-division-multiplex optical signal processing unit including the first optical splitter and first wavelength selective switches in other first wavelength-division-multiplex optical signal processing units,
wherein the first wavelength selective switch is configured to receive, as the optical input signals, an optical signal including the signal to be wavelength-division multiplexed from the first interface unit corresponding to the first wavelength-division-multiplex optical signal processing unit including the first wavelength selective switch and split optical signals from first optical splitters in other first wavelength-division-multiplex optical signal processing units, and
wherein the second wavelength-division-multiplex optical signal processing unit includes:
a second optical splitter configured to split an optical signal including the signal to be wavelength-division multiplexed from the second interface unit and output the split signals to the first wavelength selective switches in the plurality of first wavelength-division-multiplex optical signal processing units; and
a second wavelength selective switch configured to receive the split optical signals from the first optical splitters in the plurality of first wavelength-division-multiplex optical signal processing units and pass selectively an optical signal to the second interface unit.

2. The optical transport apparatus according to claim 1, wherein the plurality of first wavelength-division-multiplex optical signal processing units and the second wavelength-division-multiplex optical signal processing unit have the same circuit construction.

3. The optical transport apparatus according to claim 1, wherein each of the plurality of first wavelength-division-multiplex optical signal processing units and the second wavelength-division-multiplex optical signal processing unit further includes optical amplifiers on the output sides of the first and second wavelength selective switches and on the input sides of the first and second optical splitters.

4. The optical transport apparatus according to claim 1,
wherein the second wavelength selective switch in the second wavelength-division-multiplex optical signal processing unit is configured to selectively pass an optical signal of a predetermined wavelength included in a signal received from one of the plurality of transmission lines through the first optical splitter, and
wherein at least one of the first wavelength selective switches in the plurality of first wavelength-division-multiplex optical signal processing units is configured to output an optical signal of the predetermined wavelength included in the signal received from the one of the plurality of transmission lines to the corresponding transmission line.

5. The optical transport apparatus according to claim 1, wherein some of the first wavelength selective switches in the plurality of first wavelength-division-multiplex optical signal processing units are configured to selectively pass optical signals received from the second optical splitter in the second wavelength-division-multiplex optical signal processing unit and output the received optical signals to the corresponding transmission lines, respectively.

6. The optical transport apparatus according to claim 1,
wherein the second wavelength-division-multiplex optical signal processing unit is connected to a plurality of interface units including the second interface unit via an optical multiplexing/demultiplexing unit; and
wherein the optical multiplexing/demultiplexing unit includes wavelength-tunable filters in individual output nodes connected to the plurality of interface units.

7. An optical transport system comprising:
a network management system; and
a plurality of optical nodes connected to the network management system via a data communication network and connected to one another with fiber transmission lines,
wherein the network management system is configured to monitor and control the plurality of optical nodes,
wherein each of the plurality of optical nodes includes:
a node supervisor part configured to supervise the optical node in accordance with an instruction from the network management system;
a plurality of first optical add-drop parts configured to operate under control of the node supervisor part, correspond to, on a one-to-one basis, different transmission lines of the plurality of transmission lines, and communicate optical signals with the corresponding transmission lines, respectively;
a second optical add-drop part which is capable of being added and removed, and configured to operate under control of the node supervisor part; and
first interface parts and a second interface part each connected to at least one client apparatus to transmit or receive a client signal,
wherein each of the first optical add-drop part includes:
a first drive controller configured to control other parts under control of the node supervisor part,
a first wavelength selective switch, including a plurality of inputs, configured to multiplex, under control of the first drive controller, signals selected from optical input signals received from the plurality of inputs, and output the multiplex signal to the corresponding transmission line;
a first optical splitter configured to receive an optical signal from the corresponding transmission line and output split optical signals to a first interface part corresponding to the first optical add-drop part including the first optical splitter and first wavelength selective switches in other first optical add-drop parts,
wherein the first wavelength selective switch is configured to receive, as the optical input signals, an optical signal including the signal to be wavelength-division multiplexed from the first interface part connected to the first add-drop part including the first wavelength selective switch and the split optical signals from the first optical splitters in other first add-drop parts, and
wherein the second optical add-drop part includes:
a second drive controller configured to control other parts under control of the node supervisor part;
a second wavelength selective switch configured to receive the split optical signals from the first optical splitters in the plurality of first optical add-drop parts and pass selectively an optical signal to the second interface part under control of the second drive controller; and
a second optical splitter configured to split an optical signal including the client signal from the second interface part and output the split signals to the first wavelength selective switches in the plurality of first optical add-drop parts, respectively.

8. The optical transport system according to claim 7, wherein the plurality of first optical add-drop parts and the second optical add-drop part have a common circuit configuration.

9. The optical transport system according to claim 7,
wherein the second wavelength selective switch in the second optical add-drop part is configured to selectively pass an optical signal of a predetermined wavelength included in a signal received from one of the plurality of transmission lines through the first optical splitter, and
wherein at least one of the first wavelength selective switches in the plurality of first optical add-drop parts is configured to output an optical signal of the predetermined wavelength included in the signal received from one of the plurality of transmission lines to the corresponding transmission line.

10. The optical transport system according to claim 7, wherein some of the first wavelength selective switches in the plurality of first optical add-drop parts are configured to selectively pass optical signals received from the second optical splitter in the second optical add-drop part and output the received optical signals to the corresponding transmission lines, respectively.

11. The optical transport system according to claim 7,
wherein, when the second optical add-drop part is removed from the optical node, the optical node is configured to operate as a component of a ring network including the fiber transmission lines, and
wherein, when the second optical add-drop part is added to the optical node, the optical node is configured to operate as a component of a mesh network including the fiber transmission lines.

12. The optical transport apparatus according to claim 1,
wherein, when the second wavelength-division-multiplex optical signal processing unit is removed from the optical transport apparatus, the optical transport apparatus is configured to operate as a component of a ring network including the fiber transmission lines, and wherein, when the second optical add-drop part is added to the optical transport apparatus, the optical transport apparatus is configured to operate as a component of a mesh network including the fiber transmission lines.

\* \* \* \* \*